Feb. 7, 1956  O. J. VAN LEER ET AL  2,733,502
METHOD OF AND APPARATUS FOR MAKING STEEL DRUMS
Filed May 15, 1951  7 Sheets-Sheet 1
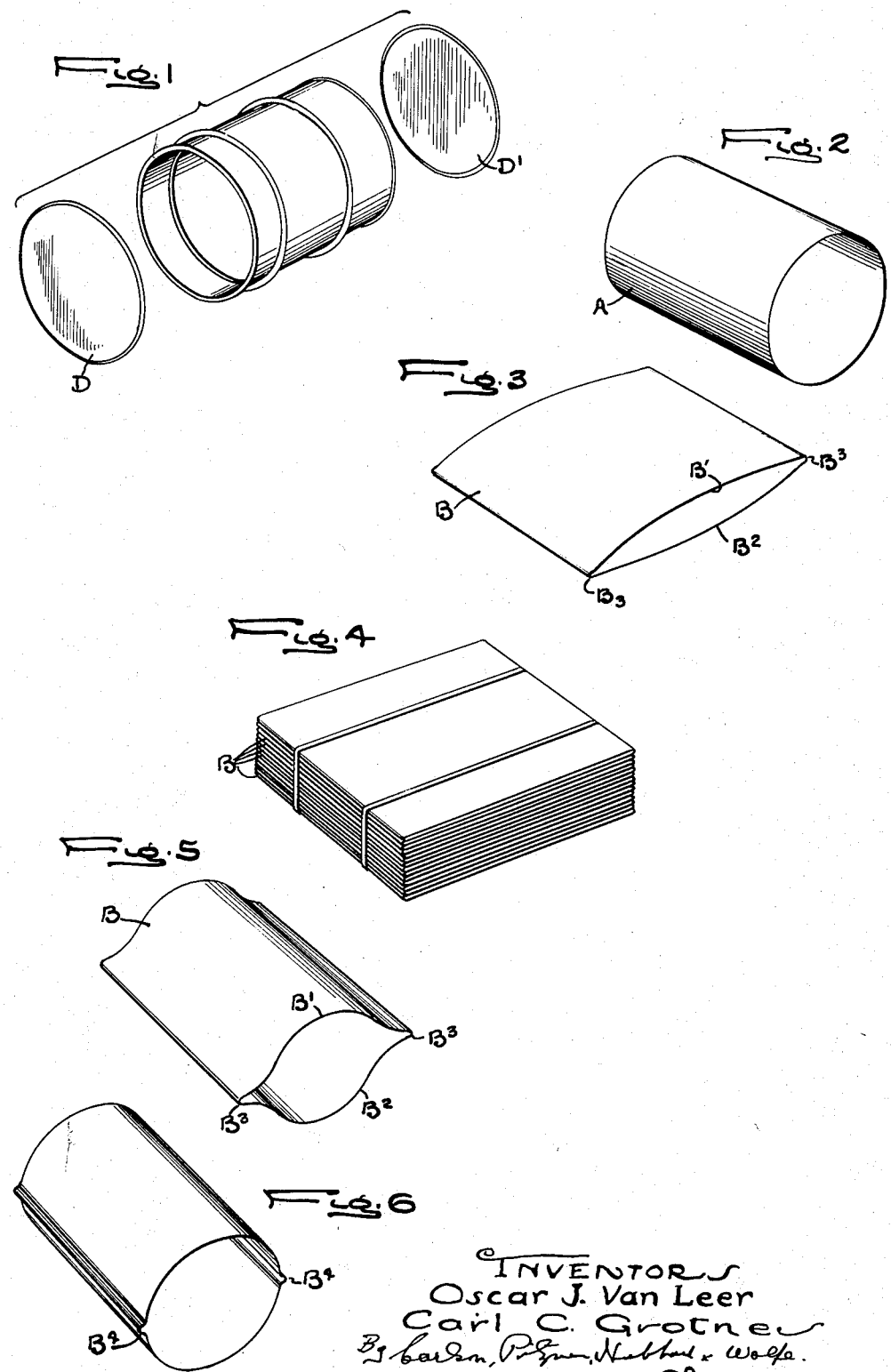

Feb. 7, 1956     O. J. VAN LEER ET AL     2,733,502
METHOD OF AND APPARATUS FOR MAKING STEEL DRUMS
Filed May 15, 1951     7 Sheets-Sheet 2
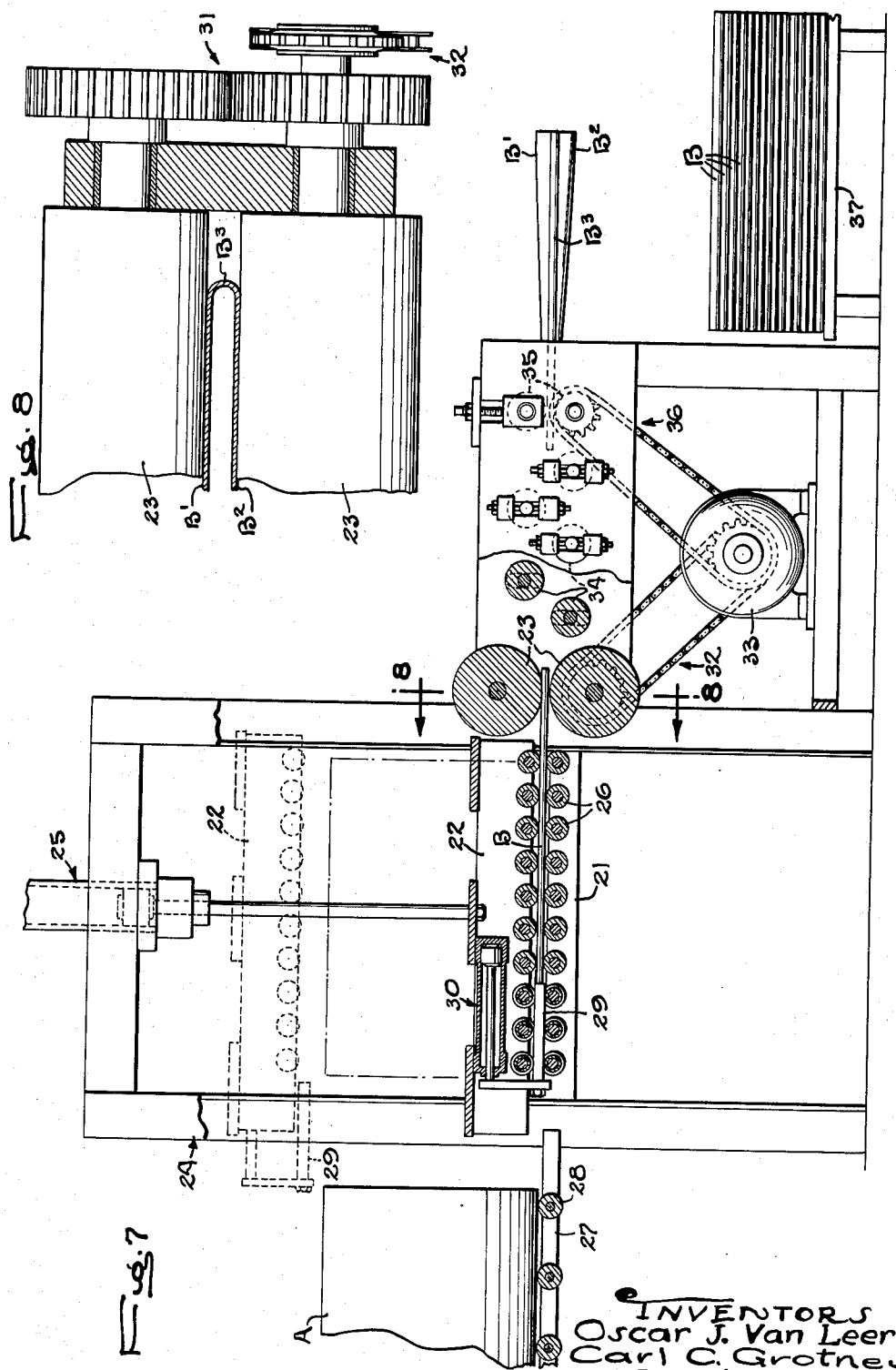
INVENTORS
Oscar J. Van Leer
Carl C. Grotnes
ATTORNEY

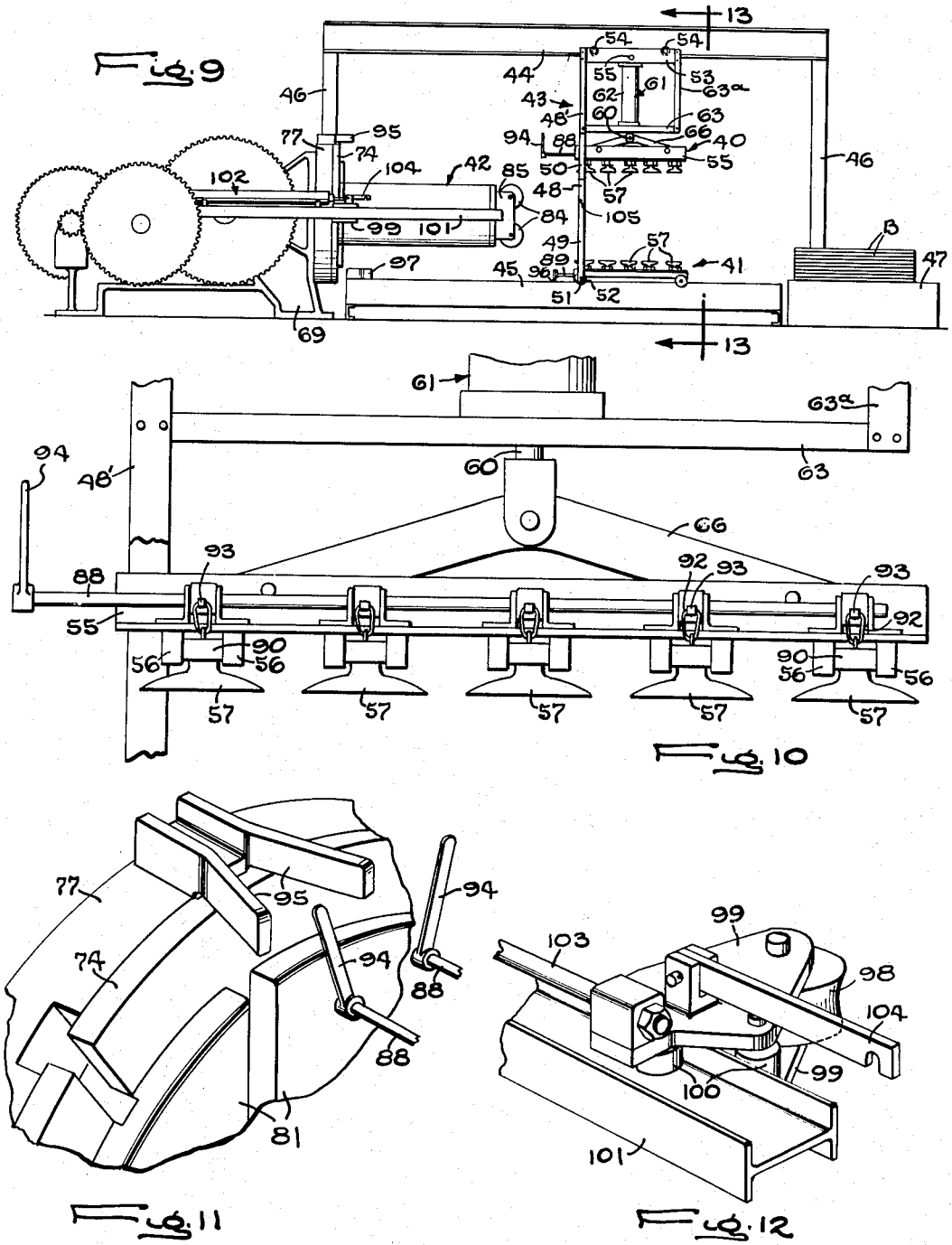

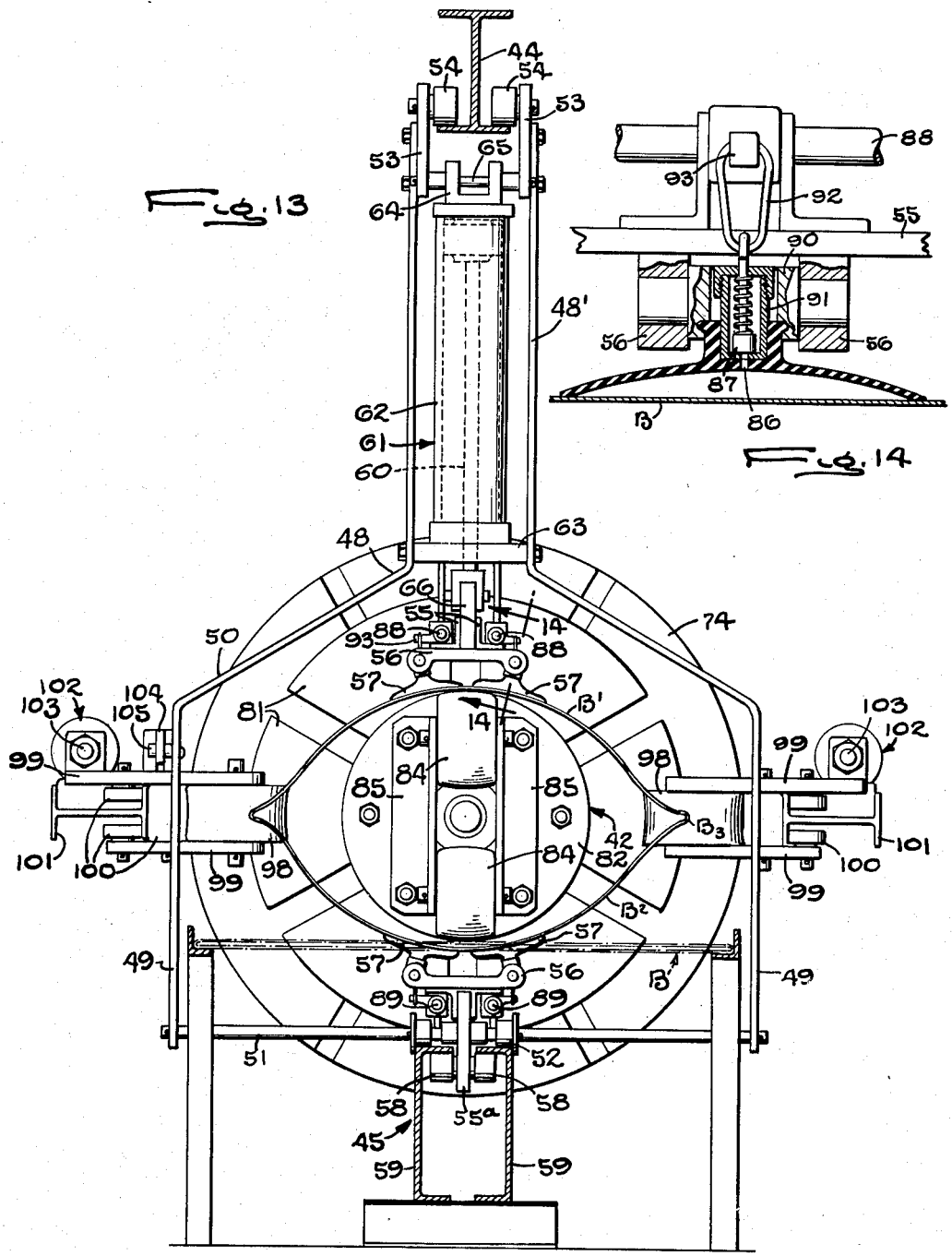

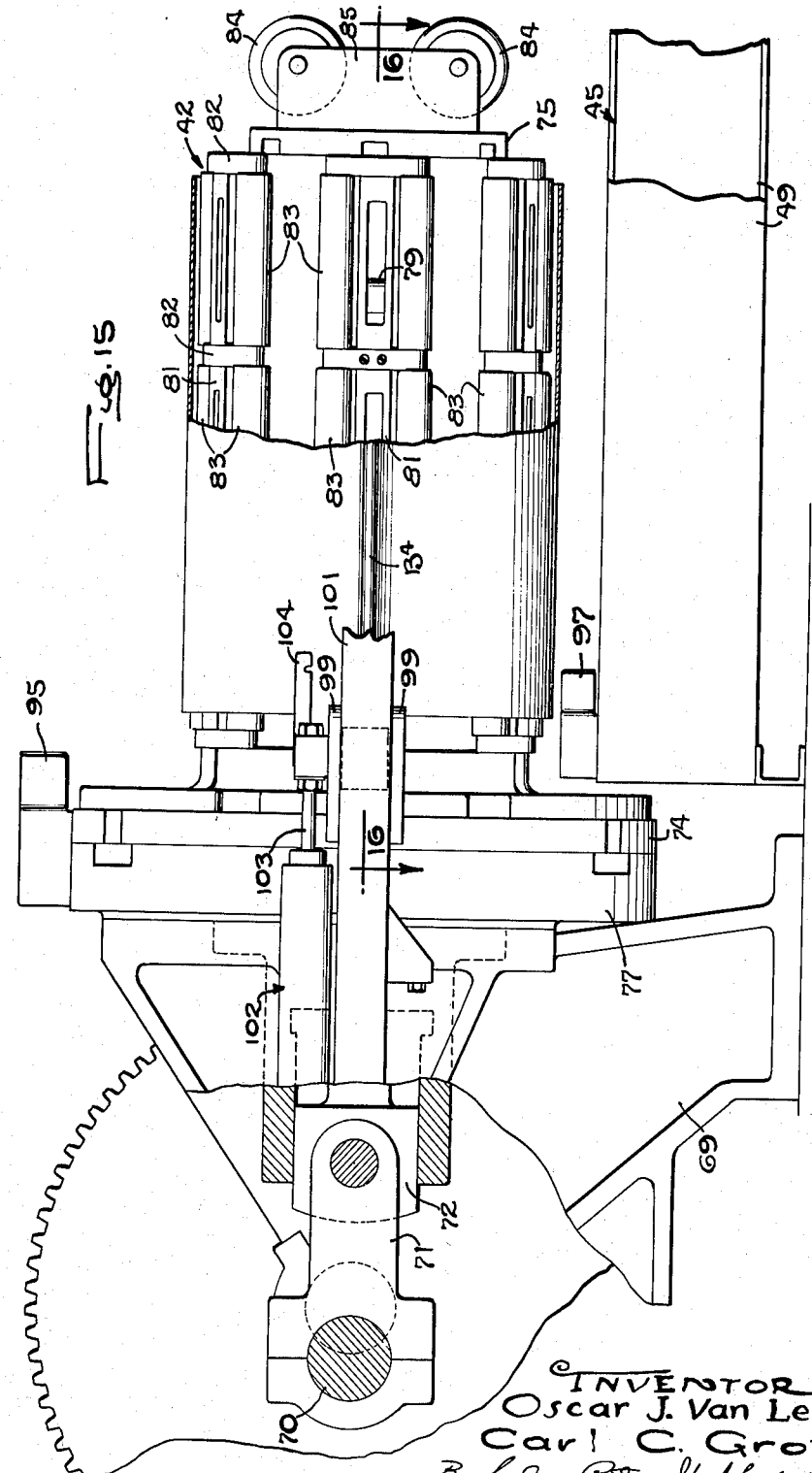

Feb. 7, 1956 O. J. VAN LEER ET AL 2,733,502
METHOD OF AND APPARATUS FOR MAKING STEEL DRUMS
Filed May 15, 1951 7 Sheets-Sheet 6
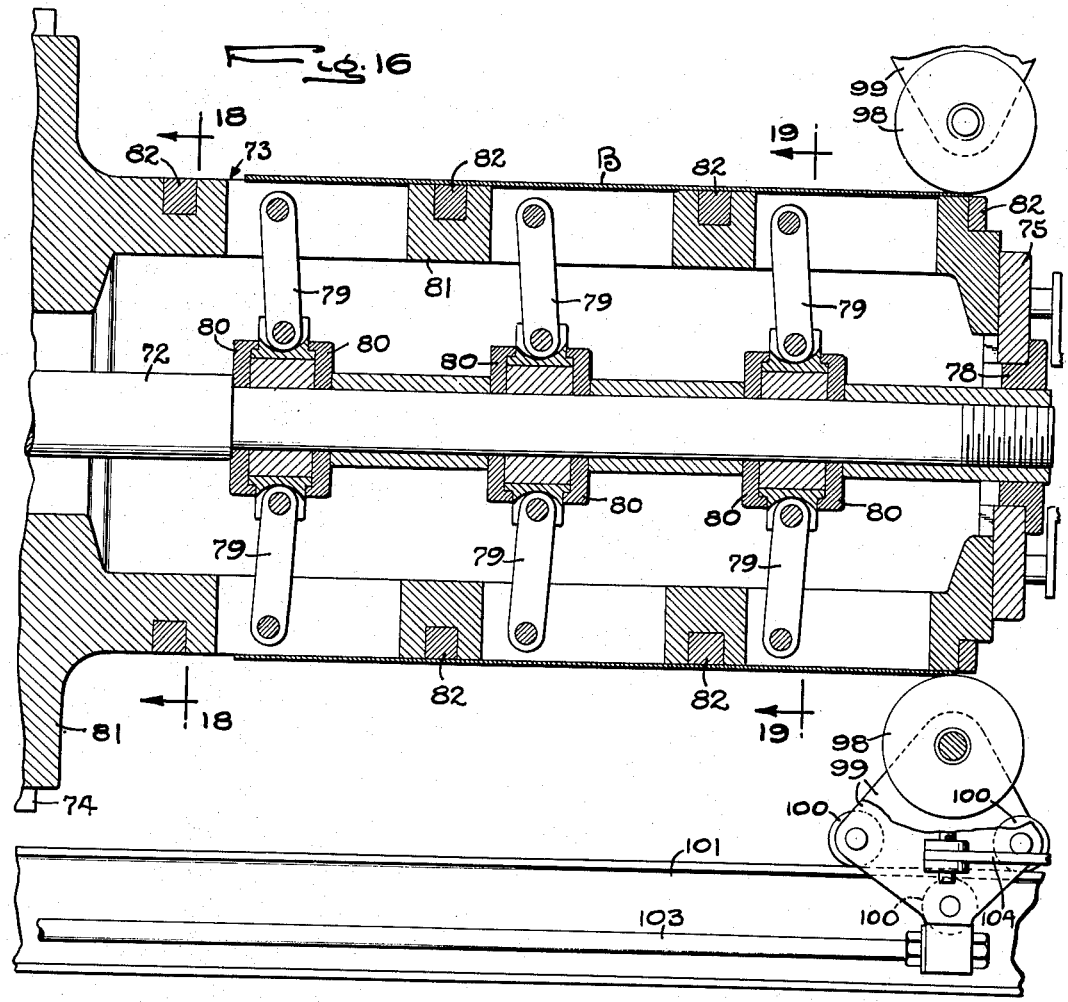
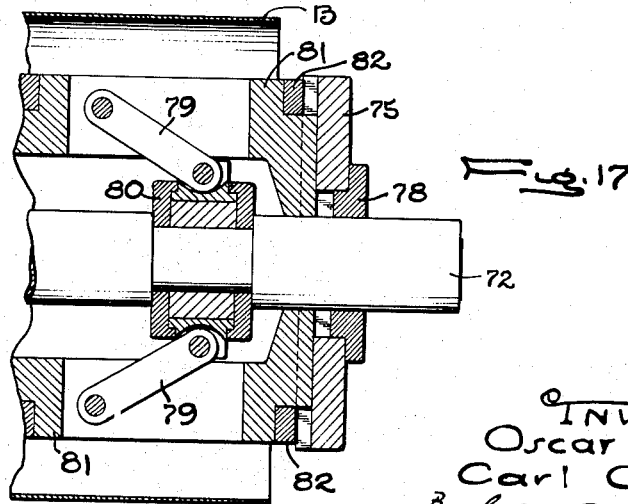
INVENTORS
Oscar J. Van Leer
Carl C. Grotnes
ATTORNEY

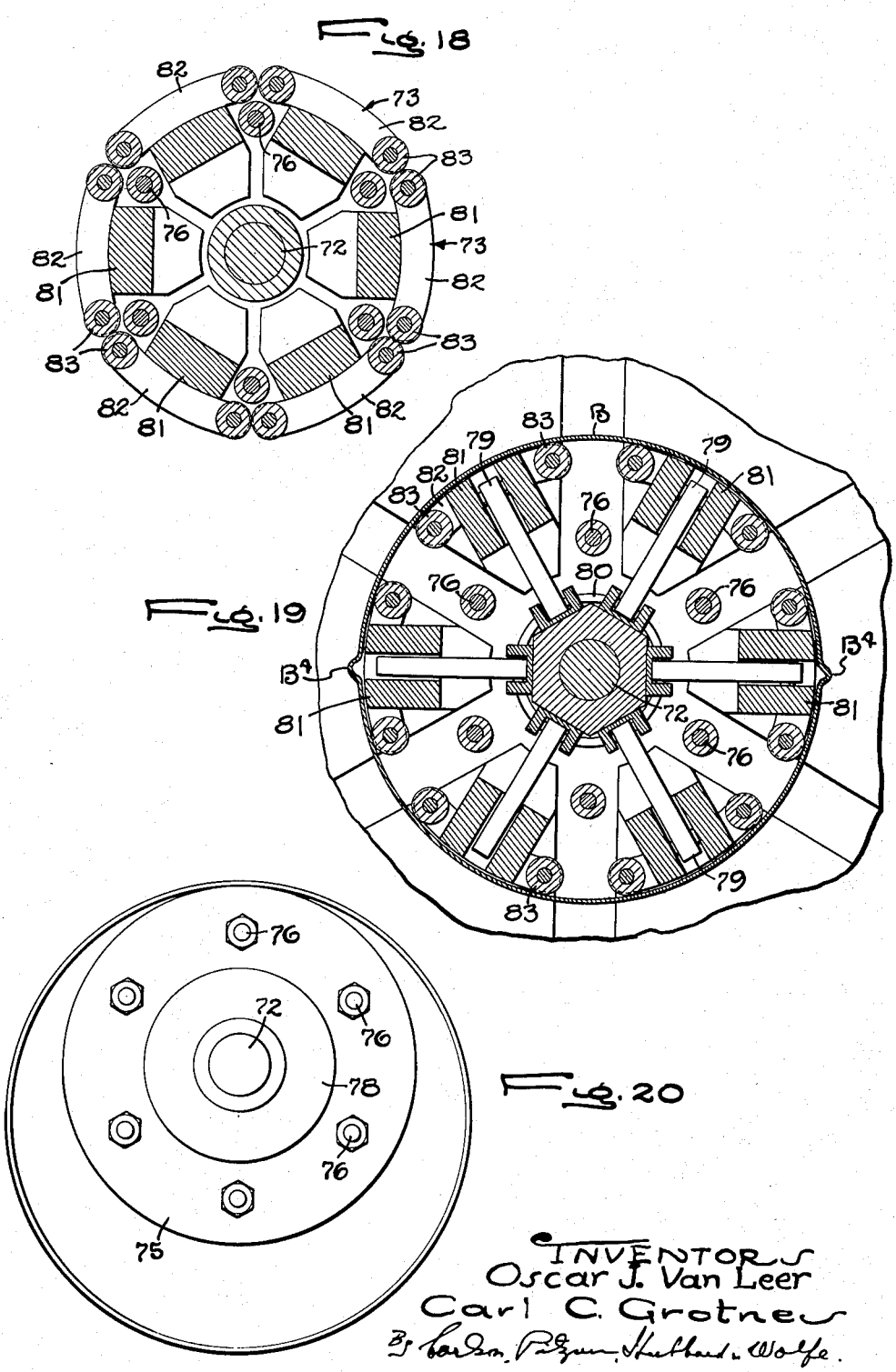

United States Patent Office 2,733,502
Patented Feb. 7, 1956

2,733,502

METHOD OF AND APPARATUS FOR MAKING STEEL DRUMS

Oscar J. van Leer, Chicago, and Carl C. Grotnes, Park Ridge, Ill., assignors to Grotnes Machine Works, Inc., Chicago, Ill., a corporation of Illinois Application May 15, 1951, Serial No. 226,394

2 Claims. (Cl. 29—458)

The invention pertains to the manufacture of steel containers or drums of the type commonly used in the shipment and storage of oil and other products, and has for its general aim the manufacture and distribution of such drums on a more economical basis than has heretofore been possible.

A major factor in the cost of producing and supplying drums of this character according to conventional methods is the bulky character of the product, which not only entails high transportion and storage charges, but is reflected in the manufacturing cost as well. The invention accordingly contemplates a new method of manufacturing steel drums in two stages, usually at widely separated points, the first including the processing of the component parts of the drum, with the bulky component, namely the cylindrical body, reduced from an initial cylindrical form to a collapsed or flattened condition so as to form a flattened body; and the second including the restoration of the flattened body to cylindrical form preparatory to the application of the heads to complete the drum. In this way the major portion of the manufacturing operation may be performed at an originating point where the necessary facilities can best be made available, the parts then shipped economically, by virtue of the reduction in bulk, to a distant point, the final operation being performed at the latter point by relatively simple equipment, that the reduction in bulk for shipping purposes is highly advantageous will be apparent from the fact that the shipping space required for the component parts as compared to completed drums is on the order of one to fifteen.

Oil drums and the like are made from relatively heavy gauge sheet steel having considerable resiliency and highly resistant to bending; also the drums must frequently be provided with an inner protective coating or liner which must be hardened by baking. To the successful solution of the problems arising from these and other factors or conditions, including the provision of apparatus for effectually performing the various operations, this invention is especially directed.

More specifically the invention has for an important object the provision of apparatus of a practical character by means of which the initially formed cylindrical body is operated upon, in the first stage of manufacture, to reduce it to a collapsed or flattened condition so as to form a hollow flattened body, and whereby, in the second stage of manufacture, this body may be restored to cylindrical form through the application of pulling forces to the opposed sides of the body whereby to perform a partial opening or initial expanding operation, followed by a final expanding operation.

In the accompanying drawings, Figs. 1–6 show the drum and particularly the body thereof in various stages of manufacture in accordance with the present invention; and Figs. 7–20 illustrate a preferred form of apparatus for carrying out the various operations, it being understood, of course, that the invention in its broader aspects is not limited to the particular construction and arrangement illustrated and hereinafter described.

In particular, Fig. 1 is an exploded perspective xiew of the component parts of a conventional steel drum as such parts have been fabricated for assembly.

Figs. 2–6 are perspective views showing respectively a cylindrical body, a flattened body formed by collapsing or flattening the cylindrical body, a stack of flattened bodies bundled for shipment, such bodies partially opened, and the flattened body in an expanded form just prior to the final operation of restoring it to its true cylindrical form and size as shown in Fig. 2.

Fig. 7 is a fragmentary longitudinal sectional view through a preferred form of apparatus for reducing the cylindrical body to its collapsed or flattened condition.

Fig. 8 is a fragmentary transverse section taken approximately in the plane of line 8—8 of Fig. 7.

Fig. 9 shows in side elevation apparatus by means of which the flattened bodies are restored to their initial cylindrical form.

Fig. 10 is a fragmentary side elevational view on a larger scale of a part of the means for applying external gripping forces to the flattened body in the first expanding operation.

Figs. 11 is a fragmentary perspective view illustrating a mechanism employed in releasing the sides of the flattened body from the gripping devices.

Fig. 12 is a similar view showing a portion of the means employed in a final rolling operation.

Fig. 13 is a transverse vertical sectional view taken approximately in the plane of line 13—13 of Fig. 9 but on a larger scale.

Fig. 14 is a detailed view of a suction cup constituting one of the gripping devices and illustrating in particular the construction whereby the sides of the flattened body may be released from the action of the gripping devices.

Fig. 15 is a fragmentary side elevational view partially in section showing the means for subjecting the partially expanded flattened body to internal expanding pressures in the operation of restoring the same to cylindrical form.

Fig. 16 is a fragmentary longitudinal section taken on the line 16—16 of Fig. 15 but on a larger scale Fig. 17 is a fragmentary sectional view showing the right-hand portion of the apparatus in Fig. 16 with the parts in the relation occupied at the beginning of the expanding operation.

Figs. 18 and 19 are respectively transverse sectional views taken in the planes of lines 18—18 and 19—19 of Fig. 16.

Fig. 20 is a fragmentary end elevational view looking from the right in Fig. 15 and showing the completed body.

In carrying out the invention the first stage of operation includes the formation of a cylindrical body A by rolling the same from a flat sheet and welding and grinding the edges thereof, all in the conventional manner; and it also includes the spraying of the interior of the body, as in present practice, with an inner coating of suitable lining material. The body is then subjected to the collapsing operation to form a flattened body B, the compressing operation being interrupted so that its opposed side portions $B^1$ and $B^2$ are spaced apart a short distance (on the order of one inch) so as to reduce the bulk of the body to a minimum while leaving the flattened body hollow for the subsequent baking operation, and at the same time avoiding a sharp bending or creasing of the metal along opposite edges of the flattened body. While the body is held in such collapsed form the opposite narrow edges are preferably subjected to a rolling operation to insure the formation of gently rounded uniform edge portions or ribs $B^3$. At the same time the tendency of the opposing side portions of the flattened body to spring apart unduly is overcome. In this initial stage of manufacture the hollow flattened bodies are passed through a baking oven (not shown) to bake and harden the inner coating. It will be observed in this connection that by baking the body while in its collapsed or flattened form the required size of the baking oven is greatly reduced. The flattened bodies B are finally stacked and bound in bundles of convenient size for storage or shipment, as shown in Fig. 4.

In the final stage of manufacture the opposing side portions of the hollow flattened body are subjected to the application of opposite pulling forces through the use of external gripping devices applied to side portions $B^1$ and $B^2$ to effect a partial expansion. The flattened body is highly resistant to this opening operation due to the fact that the body is made of heavy gauge sheet steel; moreover it is inherent in such initial expansion of the flattened body that the radius of curvature of the side portions constantly changes. In the solution of this problem it has been found that by the use of a plurality of external suction gripping devices, preferably arranged in two rows on opposite sides of the flattened body and including suction cups of relatively soft rubber, the flattened body may be expanded to an elliptical form, as shown in Fig. 5. While the flattened body is held in such partially expanded form, it is subjected to the operation of an expanding die by means of which internal outwardly directed pressures are applied to the sides of the flattened body. Specifically, it has been found that a drum body having an initial diameter of 22½" may, after reduction to flattened form, be opened by the application of pulling forces to approximately 20", ample for the reception of the expanding die. In the present illustrative embodiment the operation of the latter is interrupted somewhat short of the attainment of the initial diameter of the body so as to avoid stretching of the metal, leaving oppositely protruding longitudinally extending beads $B^4$ as shown in Fig. 6.

It will be apparent that in the operation of expanding the body from the elliptical form as shown in Fig. 5 to a cylindrical form, it is essential that the metal of the body be permitted to travel circumferentially in order to avoid a stretching of the metal. Also it is necessary to avoid injury to the liner by any scraping action between the pressure elements and the interior of the body. Accordingly, the expanding pressures to which the partially opened body is subjected are transmitted through the medium of rollers extending parallel with the axis of the body and spaced apart a short distance circumferentially thereof.

Finally, the body is restored to its original cylindrical form (Fig. 2). In the present embodiment the expanded body (Fig. 6) is subjected to an external rolling operation while still in position upon the expanding die so as to flatten out the opposite ribs or beads $B^4$. By thus eliminating the beads any tendency of the body to resume its elliptical form is avoided. The body having thus been restored to its initial form and size, it is only necessary to apply to opposite ends thereof the heads D and D' (Fig. 1) by the usual flanging and seaming operations.

Figs. 7 and 8 show a preferred apparatus for converting the initially formed cylindrical body A to a hollow flattened body B. Preferably this operation is performed in successive steps including the compression of the body between two platens 21 and 22 followed by the advance of the collapsed body between a pair of rolls 23. As shown, the two platens are disposed horizontally in an upright frame 24, the lower platen being stationary and the upper movable vertically by means of a pneumatic actuator 25. Each of the platens is equipped with closely spaced parallel rollers 26 of a length approximately equal to the width of the body in its flattened form. A feed table 27 which may be equipped with rollers 28 is mounted on the frame for convenience in advancing the body into position between the platens when the upper platen is in its upper retracted position as shown in broken lines in Fig. 7.

The rolls 23 are mounted on the frame at the side thereof opposite the feed table. Upon the completion of the compressing operation, the body is advanced into engagement with these rolls as by means of a centrally disposed pusher 29 arranged for actuation by a pneumatic actuator 30. As shown in Fig. 8, the rolls 23 are of a length somewhat in excess of the width of the collapsed body. They are connected by gearing 31, and one of the rolls, herein the lower one, has a chain and sprocket driving connection 32 with the drive shaft of a motor 33, so that both rolls are positively driven in opposite directions and at the same speed. Thus while the flattened body is maintained in collapsed condition by the platens, it is advanced by the rolls 23 so as to be subjected to the rolling action of the platen rollers 26 as well as by the rolls 23.

Upon emerging from the rolls 23 the collapsed body may be passed between a series of relatively staggered straightening rolls 34 and finally between a pair of feed rolls 35 driven from the motor shaft by a chain and sprocket drive 36. As the flattened bodies emerge from the terminal feed rolls 35 the opposed side portions $B^1$ and $B^2$ tend to bow in opposite directions, as shown in Fig. 3, but because of the rolling of the edge portions $B^3$ such outward bowing of the side portions is minimized. In any case the flattened bodies tend to resume their flattened form when stacked one upon the other, under their own weight. As shown in Fig. 7, as the completed flattened bodies are discharged from the feed rolls they drop onto a suitable platform 37.

It will be understood that in addition to the apparatus thus described for forming the flattened bodies, the equipment in the first stage of operations will include rolling, forming, welding and grinding, as well as baking ovens. As above indicated, it is contemplated that this initial stage of manufacture will be performed where the required equipment and power facilities are readily available.

In the second stage of manufacture, which it is contemplated will usually take place at a distant point, the flattened bodies are operated upon to restore them to their original cylindrical form, by relatively simple equipment not entailing the use of heavy electric power sources. This operation may, therefore, be performed for example in or near oil fields or other remote places where the drums are to be placed in use.

The drum body having been collapsed with the edge portions thereof set by working or rolling the heavy gauge steel is highly resistant to expansion. Moreover, when the body has been coated to provide an inner lining, the forcible insertion of an expanding tool to effect a separation of the sides of the flatened body is impracticable. Accordingly, it is important that the expanding operation be performed in two steps, first through the application of gripping devices applied to the sides of the flattened body and capable of exerting strong oppositely directed pulling forces so as to effect a partial expansion of the body, and second by the operation of internal outwardly directed forces applied to the interior of the partially expanded body by means of pressure devices of such character as to permit of free movement of the metal circumferentially. It is also important that upon the completion of the second step of the expanding operation and while the pressure devices continue to hold the body expanded, the edge portions, now in the form of narrow longitudinal ribs or beads $B^4$, be "ironed out" by a final rolling operation and the drum thus restored to its initial form and size.

A preferred form of apparatus for accomplishing the foregoing operations in the second stage of manufacture is shown in Figs. 9–20. This apparatus comprises in general a first expander having a multiplicity of gripping devices mounted upon vertically spaced heads 40 and 41 (Fig. 9), at least one of which heads is mounted for vertical movement by appropriate power means; and a second or internal expander which may comprise a generally cylindrical expanding die 42 having radially movable pressure devices. In order that the partially expanded body may be held in such condition while being positioned for the internal expanding operation, the two expanders are mounted for relative movement in a direction axially of the body. In the present instance the opposed gripping heads 40 and 41 are mounted upon a carriage 43 supported for movement along vertically spaced horizontal tracks 44 and 45 mounted upon upright end members 46 to form a rigid frame structure; and the internal expander is disposed at one end of this frame structure with its die 42 projecting into the frame centrally thereof (Fig. 13). At the opposite end of the frame a platform 47 may be provided for supporting the stack of flattened bodies to be operated upon.

In the present specific embodiment the carriage 43 comprises a frame having opposed upright side bars 48 (Fig. 13) bent to form relatively closely spaced upper portions 48′, widely spaced parallel lower portions 49 and intermediate inclined portions 50. Journaled in the lower ends of the bars 48 is a shaft 51 carrying rollers 52 which bear upon the lower track 45 of the frame. To the upper end of the bars 48 are attached a pair of plates 53 spaced apart transversely and carrying two pairs of rollers 54 (Fig. 9) which bear upon the upper track 44.

Each of the gripper heads 40 and 41 comprises, as herein shown, an elongated member 55 in the form of a casting having pairs of lugs 56 (Fig. 10) pivotally supporting a multiplicity of suction cups 57 constituting external gripping devices. Preferably, these devices are arranged in two pairs of vertically spaced rows. Brackets 55a depend from opopsite ends of the lower head and carry rollers 58 bearing on the underside of the track 45, and one of these brackets is apertured for the passage of the shaft 51 carrying the supporting rollers 52. As seen in Fig. 13, the lower track is formed by pairs of opposed channel members 59 spaced a short distance apart to define a slot through which the brackets 55a depend. The lower head is thus supported against vertical movement relative to the track 45 while being permitted to travel horizontally along the track.

The upper head 40 is likewise connected with the carriage for movement therewith and to this head is attached the piston rod 60 of a pneumatic actuator 61 having a cylinder 62 supported in a rectangular frame (Fig. 9) including the bars 48, the plates 53 and a bottom crossbar 63, the latter being connected to the plates 53 by an upright bar 63a.

At its upper end the cylinder 62 is provided with a yoke 64 (Fig. 13) through which extends a rod 65, the opposite ends of which are secured in the frame plates 53. As shown in Figs. 9 and 10, the piston rod is attached to the upper head through the medium of a bar 66 extending lengthwise of the head and rigidly secured to the opposite ends of the member 55.

Referring now to Fig. 9, a flattened body to be operated upon is placed in position upon the lower head 41 of the carriage with the bottom side portion B² resting upon the upwardly facing suction cups 57 in properly centered position with respect to the axis of the actuator 61 (Fig. 13). The actuator is then operated through the medium of the usual controls (not shown) to lower the upper head and carry the suction cups thereon downwardly into engagement with the upper side portion B¹ of the body, the downward pressure being continued until the cups of both upper and lower rows are pressed flat against the body so as to exhaust the air from the cups. The latter are made of soft pliable rubber of relatively large diameter (Fig. 14) not only to increase their effectiveness but also to permit them to conform to the changing curvature of the drum in the resulting expanding operation.

In the first expanding operation, the actuator 61 is operated to cause the upper head 40 to move upwardly relative to the lower head, thereby effecting a separation of the side portions B¹ and B² by the application of external pulling forces by the cups 57. The expanding operation is continued until the body assumes an elliptical form in which its vertical diameter is somewhat in excess of the diameter of the internal expanding die 42.

The body having been partially expanded in the manner set forth, the association thereof with the expanding die 42 for the second expanding operation is accomplished in the present embodiment by moving the carriage 43 to the left in Fig. 9 while the gripping devices continue to hold the body in its partially expanded condition.

The die 42 forms a part of an expanding machine which may be of the type disclosed in Grotnes Patent No. 1,456,734, issued May 29, 1923. In brief, it comprises (Fig. 15) a main frame 69 supporting the die 42 in outboard relation and having a power driven crankshaft 70 connected by a pitman 71 with an axially slidable drawbar 72. As shown in Figs. 16–19, the die comprises a circumferentially arranged series of pressure devices 73 guided for radial sliding movement in suitable ways formed in two end plates 74 and 75 rigidly connected by tie rods 76. The plate 74 is mounted on a head 77 rigid with the frame 69 and is centrally apertured for the passage of the drawbar 72, the outer free end of which bar is supported in a bearing 78 in the outer end plate 75. Radial movement is imparted to the pressure devices 73 in the axial movements of the drawbar by means of toggle links 79 interposed between the pressure device and collars 80 rigidly held against axial movement on the drawbar 72.

In view of the elliptical character of the body in its partially expanded condition, the pressure devices 73 are especially constructed to permit of free movement of metal of the body circumferentially as the body is restored to cylindrical form. For this purpose the pressure devices comprise rigid elongated members 81 having axially spaced cross arms 82 (Fig. 18) secured in transverse grooves in the members and coacting with each other and with the end plates to support parallel rows of rollers 83 (Fig. 15), the rollers being suitably journaled in the ends of the cross arms and in the end plates. The arrangement is such that the outer peripheral portions of the rollers project slightly beyond the outer faces of the members 81 so that the expanding forces are transmitted to the body solely by the rollers. From a comparison of Figs. 18 and 19 respectively showing the die in collapsed and expanded conditions, it will be apparent that at the beginning of the expanding operation the circumferential spacing of the adjacent rollers of contiguous members 81 gradually increases as the members move outwardly. The rollers thus act upon the body with a rolling action in a circumferential direction. Experience has shown that in this way no objectionable marring or scraping of the pressure devices upon the body occurs, which is especially important when the bodies are coated with an inner protective liner.

To facilitate movement of the partially expanded body over the die 42, the latter may be equipped with guide means herein in the form of a pair of pilot or guide rolls 84 suitably supported on brackets 85 mounted on the outer end plate 75 (Fig. 13), these rollers having rounded peripheries as shown in Fig. 13. The rollers are appropriately spaced apart so as to guide the partially expanded body over the die.

Prior to the performance of the second expanding operation, the side portions B¹ and B² of the body are released from the action of the suction gripping devices 57. Accordingly, provision is made for venting the cups 57 and preferably this is accomplished automatically upon the movement of the body into position over the die. For this purpose each of the suction cups has a central venting port 86 (Fig. 14) normally closed by a spring pressed valve 87, and means is provided for opening the valves of all of the cups simultaneously by the operation of upper and lower rockshafts 88 and 89 (Fig. 13).

In the present specific embodiment, the suction cups 57 are suitably mounted in recessed blocks 90 pivoted in the lugs 56 of the head members 55, and the cups are provided with metallic valve cages 91. Each valve 87 has an operating stem protruding from the cage and connected by a bail 92 with a crank 93 on one or the other of the rockshafts 88, 89.

For the operation of the two rockshafts as an incident to the movement of the partially opened body into position over the die, the upper shaft 88 is provided with an arm 94 engageable with a cam block 95 (Figs. 9 and 11) rigid with the frame 46. Similarly, the lower shaft 89 is equipped with an arm 96 engageable with a cam 97 mounted on the lower track member 45. The timing is such that the suction cups are released from their hold on the body as the latter moves into proper position relative to the die 42.

Upon the completion of the second expanding operation, the drum body is restored to its initial form except for the presence of the longitudinal extending diametrically opposed beads $B^4$. To attempt to remove these ribs by the operation of the expanding die would involve the application of such forces as to result in stretching of the metal circumferentially. Accordingly, the body is subjected to a final external rolling operation longitudinally of the drum while the latter is still in position on the die and before contraction thereof, which not only eliminates the beads but effects a revolving of the metal so as to overcome the effects of the initial working thereof in the operation of forming the flattened body. Preferably this rolling operation is performed by a pair of diametrically opposed flattening rolls 98, mounted on brackets 99 which, in turn, are guided by rollers 100 for movement longitudinally of the body by means of horizontal frame members 101 suitably secured to the expander frame 69. Pneumatic actuators 102 have their piston rods 103 connected with the respective brackets 99, and when the die expanding operation has been completed, the actuators are operated to advance the flattening rolls 98 longitudinally relative to the body and thereby remove therefrom the beads $B^4$. Upon the withdrawal of the flattening rolls by the actuator, the die 42 is collapsed and the completely restored body removed therefrom.

The actuators 102 may also be utilized for moving the carriage 43 with a partially expanded body thereon over the expanding die 42. For this purpose one of the brackets may be provided with a latch 104 engageable with a pin 105 on one of the carriage frame bars 48, it being, of course, necessary to impart an additional advancing movement to the bracket by the actuator to carry the latch into engagement with its pin on the carriage.

Summarizing the operation, in the first stage of manufacture in accordance with the invention, a cylindrical body A preformed in a conventional manner and coated at least interiorly thereof with a suitable lining material is compressed between platens 21 and 22 (Fig. 7) until opposite side portions thereof are spaced apart a short distance on the order of one inch, whereupon the opposite narrow edges of the body are set by passing the body between flattening rolls 23. From the latter the body passes through straightening rolls 34 and finally is discharged by feed rollers 35. The cylindrical bodies are thus converted to hollow flattened bodies B. The latter are then passed through a baking oven for the purpose of hardening the applied interior coating, it being observed that the volumetric capacity required for the baking process is greatly reduced as compared to that which is normally required for baking the bodies in cylindrical form.

Because of the inherent resiliency of the metal from which the bodies are formed, the side portions $B^1$ and $B^2$ of the flattened bodies tend to bow out slightly, but such bowing is limited by the rolling and setting of the edges of the body.

In the next operation the flattened bodies are stacked and bound together in bundles for convenient shipment. In this operation the bowed side portions of the flattened bodies are compressed into flattened form by their inherent weight when stacked one upon the other and are held in this form when bound together in bundled form.

In the second stage of operations the flattened bodies are subjected to first and second expanding operations through the use of the apparatus shown generally in Fig. 9. Here the flattened bodies are successively placed in position between gripper heads 40 and 41, the upper head lowered to press the suction gripping cups 57 flat against the opposing side portions $B^1$ and $B^2$, thereby exhausting the air from the cups. Thereupon the upper head is elevated and the side portions of the body separated, the operation being continued until the body is expanded to an extent sufficient to receive the die 42. Thereupon the carriage 43 is advanced to place the partially expanded body over the expanding die for the second expanding operation. Here the pressure devices are expanded radially by the operation of the drawbar 71 and the toggle links 79, causing the rollers 83 to engage with the inner surfaces of the side portions $B^1$ and $B^2$ of the body with a rolling action permitting free circumferential movement of the metal and at the same time avoiding injury to the inner lining.

Upon the completion of this second expanding operation (Fig. 19) the remaining longitudinal beads $B^4$ are removed by the operation of opposed external flattening rolls 98 advanced longitudinally of the body by the pneumatic actuators 102. Thereupon the die 42 is collapsed by the operation of the drawbar 72 and the completely restored body removed. It is now ready for the final operation including the flanging of the ends of the body (Fig. 1), and if desired the formation of circumferential beads, and finally the application of the heads D to complete the drum.

We claim as our invention:

1. The manufacture of steel drums in successive stages of which the first comprises making a cylindrical body, spraying the interior of the cylindrical body with a coating of lining material, then reducing the body to a flattened form by compressing the body transversely until opposite side portions are spaced a short distance apart, and thereupon passing the flattened body through an oven to bake and harden the coating; and the second of which stages comprises partially expanding the flattened body by the application of outwardly directed pulling forces to opposite side portions thereof so as to produce an elliptical form having opposed curving side portions, then converting the body from such elliptical form to cylindrical form by applying outwardly directed pressures through the medium of rollers to the interior of the body so as to permit free peripheral movement of the coated metal, and finally applying heads to the opposite ends of the body.

2. In an apparatus for making steel drums from flattened bodies having opposed substantially parallel side portions, the combination of an expanding die, means engageable with said side portions of the flattened body to separate the same whereby to convert the body to a substantially open elliptical form with the side portions spaced apart a distance sufficient to receive said die, means for relatively moving the die and the separating means to position the opened body in concentric relation to the die, said die comprising a plurality of pressure elements guided for radial movement and having rollers closely spaced circumferentially so as to engage each of said side portions at a plurality of points, and actuating means for moving said pressure elements radially to convert the body from elliptical to cylindrical form, said rollers being disposed on axes parallel with the axis of the body so as to permit free peripheral movement of the metal in such conversion of the body to cylindrical form.

References Cited in the file of this patent

UNITED STATES PATENTS

| | | | |
|---|---|---|---|
| 746,899 | Todd | Dec. 15, | 1903 |
| 955,117 | Ellis | Apr. 12, | 1910 |
| 1,031,000 | Higgin | July 2, | 1912 |
| 1,225,200 | Young | May 8, | 1917 |
| 1,402,433 | Monroe | Jan. 3, | 1922 |
| 1,434,417 | Ward | Nov. 7, | 1922 |
| 1,774,231 | Hornsberger | Aug. 26, | 1930 |
| 1,862,813 | Vance | June 14, | 1932 |
| 1,863,446 | Kronquest | June 14, | 1932 |
| 1,959,369 | Kronquest | May 22, | 1934 |
| 1,962,166 | Yost | June 12, | 1934 |
| 1,966,380 | Dodge et al. | July 10, | 1934 |
| 1,984,600 | Sedwick | Dec. 18, | 1934 |
| 2,006,087 | Miller | June 25, | 1935 |
| 2,028,798 | Murch | Jan. 28, | 1936 |
| 2,138,807 | O'Neil | Nov. 29, | 1938 |
| 2,163,504 | Thomas | June 20, | 1939 |
| 2,436,409 | Thornburgh | Feb. 24, | 1948 |